(12) United States Patent
Dai (10) Patent No.: US 12,306,636 B2
(45) Date of Patent: May 20, 2025

(54) INTELLIGENT VOICE CONTROLLED PIPELINE AND AIR DUCT VIDEO INSPECTION ROBOTIC SYSTEM

(71) Applicant: Advanlink Inc, Fremont, CA (US)

(72) Inventor: Fei Dai, Richmond Hill (CA)

(73) Assignee: Advanlink Inc, Fremont, CA (US)

( * ) Notice: Subject to any disclaimer, the term of this patent is extended or adjusted under 35 U.S.C. 154(b) by 414 days.

(21) Appl. No.: 17/848,018

(22) Filed: Jun. 23, 2022

(65) Prior Publication Data

US 2022/0317699 A1    Oct. 6, 2022

Related U.S. Application Data

(63) Continuation-in-part of application No. PCT/CN2019/129914, filed on Dec. 30, 2019.

(30) Foreign Application Priority Data

Dec. 5, 2019   (CN) .......................... 201911235553.4

(51) Int. Cl.

| | |
|---|---|
| *G10L 15/28* | (2013.01) |
| *G05D 1/00* | (2006.01) |
| *G10L 15/22* | (2006.01) |
| *H04N 7/18* | (2006.01) |
| *H04N 23/57* | (2023.01) |
| *H04N 23/66* | (2023.01) |
| *H04N 23/695* | (2023.01) |
| *H04N 23/50* | (2023.01) |
| *H04W 4/80* | (2018.01) |

(52) U.S. Cl.
CPC ......... *G05D 1/0246* (2013.01); *G05D 1/0255* (2013.01); *G10L 15/22* (2013.01); *H04N 7/183* (2013.01); *H04N 23/66* (2023.01); *H04N 23/695* (2023.01); *G10L 2015/223* (2013.01); *H04N 23/555* (2023.01); *H04W 4/80* (2018.02)

(58) Field of Classification Search
CPC ... G10L 15/22; G10L 2015/223; G10L 15/28; H04N 7/183; H04N 23/66; H04N 23/695; H04N 23/555; H04N 7/185; H04N 23/57; H04N 7/18; H04W 4/80; B25J 11/00; B25J 19/0054; B25J 19/023; B25J 19/026
See application file for complete search history.

(56) References Cited

U.S. PATENT DOCUMENTS 9,924,139 B2 *   3/2018   Olsson ................. B65H 75/364
2017/0326724 A1  11/2017  Wei

FOREIGN PATENT DOCUMENTS

CN    102506737        6/2012
CN    103019262 A  *   4/2013
(Continued)

*Primary Examiner* — Bobbak Safaipour
*Assistant Examiner* — Joshua Chen (57) ABSTRACT

An intelligent voice-controlled pipeline and air duct video inspection robotic system comprises an image acquisition unit, a control unit, a voice control device, and an in-pipe crawling device. The image acquisition unit is positioned on the in-pipe crawling device, and the in-pipe crawling device is connected to the control unit through a cable. The in-pipe crawling device is configured to move in a pipeline, collect images in the pipeline using the image collecting unit, and transmit collected image information to the control unit through the cable. The voice control device is connected to the control unit.

6 Claims, 8 Drawing Sheets

(56) References Cited

FOREIGN PATENT DOCUMENTS

| | | | |
|---|---|---|---|
| CN | 203133608 | 8/2013 | |
| CN | 103672293 B * | 5/2016 | ............. F16L 55/32 |
| CN | 105715903 | 6/2016 | |
| CN | 105915859 | 8/2016 | |
| CN | 108533881 A | 9/2018 | |
| CN | 108689325 | 10/2018 | |
| CN | 208825975 | 5/2019 | |
| CN | 110346131 | 10/2019 | |

* cited by examiner

INTELLIGENT VOICE CONTROLLED PIPELINE AND AIR DUCT VIDEO INSPECTION ROBOTIC SYSTEM

FIELD OF THE INVENTION

The invention relates to the technical field of pipeline/air duct video inspection robots, in particular to an intelligent voice-controlled pipeline and air duct video inspection robotic system.

BACKGROUND OF THE INVENTION

At present, large pipelines or air ducts should be overhauled after a period of use. The purpose is to reduce pipeline damage caused by small problems accumulating into major problems during long-term use of the pipeline. The pipeline needs to be manually inspected during the inspection process, in order to reduce the occurrence of leakage during subsequent use of the pipeline due to minor problems. Manual inspection and detection in the pipeline require a large number of workers to enter the pipeline for inspection; at the same time, the situation of the workers in the pipeline is uncontrollable at times (for example, if the upstream brake is opened by mistake). The workers inside the pipeline may be injured. Therefore, there is an urgent need for a system that can replace workers to enter the pipeline for inspection.

SUMMARY OF THE INVENTION

The present invention discloses an intelligent voice-controlled pipeline and air duct video inspection robotic system. The system comprises an image acquisition unit, a control unit, a voice control device, and an in-pipe crawling device. The image acquisition unit is positioned on the in-pipe crawling device, and the in-pipe crawling device is connected to the control unit through a cable. The in-pipe crawling device is configured to move in a pipeline, collect images in the pipeline using the image collecting unit, and transmit collected image information to the control unit through the cable. The voice control device is connected to the control unit. The in-pipe crawling device comprises an electric crawling device and a manual crawling device.

BRIEF DESCRIPTION OF THE DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the present invention. That is, the dimensions of the components of the present invention, independently and in relation to each other can be different. It should be noted that the drawings are schematic and not necessarily drawn to scale. Some drawings are enlarged or reduced to improve drawing legibility.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and is made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. When not explicitly defined herein, to the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate. As used herein, the term "proximate" refers to positions that are situated close/near in relationship to a structure. As used in the following description, the term "distal" refers to positions that are situated away from positions.

Figure 1:
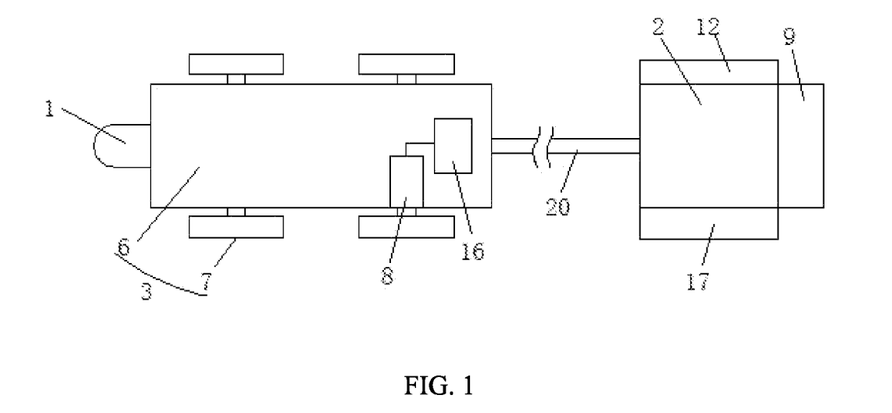
FIG. 1 is a schematic diagram of the structure of the present invention.
Figure 2:
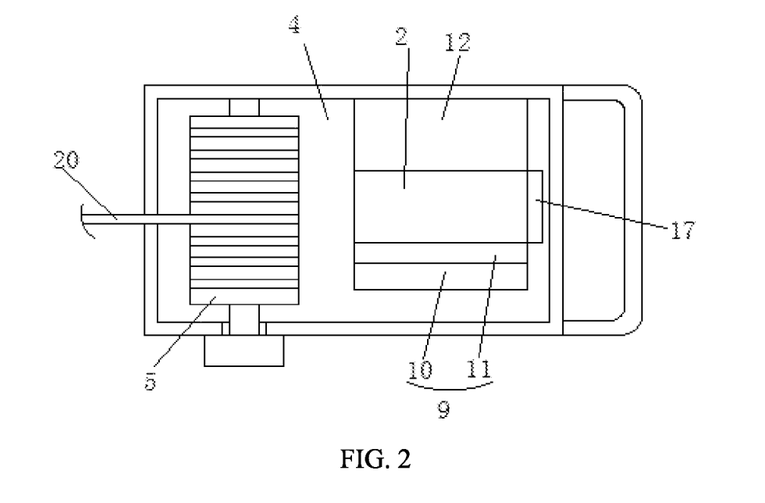
FIG. 2 is a schematic diagram of the cable rack structure of the present invention.
Figure 3:
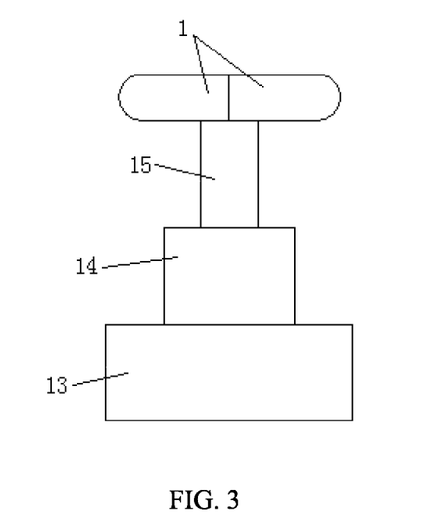
FIG. 3 is a schematic diagram of the structure of the pan-tilt mount of the present invention.

According to FIGS. 1-3, the embodiment of the present invention provides an intelligent voice-controlled pipeline and air duct video inspection robotic system, comprising: an image acquisition unit 1, a control unit 2, a voice control device 9 and an in-pipe crawling device 3. The image acquisition unit 1 is positioned on the in-pipe crawling device 3. The in-pipe crawling device 3 is connected to the control unit 2 through a cable 20. The in-pipe crawling device 3 is configured to move in the pipeline. After collecting the images in the pipeline using the image acquisition unit 1, the collected image information is transmitted to the control unit 2 through the cable 20. The voice control device 9 is connected to the control unit 2. The in-pipe crawling device 3 may comprise an electric crawling device and a manual crawling device.

In use, the image acquisition unit enters the pipeline or air duct through the in-pipe crawling device in the pipeline. The image acquisition unit transmits the collected signals to the control unit through a cable. The control unit is provided with a display for viewing the image information returned by the image acquisition unit. Intuitive display of the internal situation of the pipeline can be realized through the display screen, so as detect the interior of the pipeline. When the in-pipe crawling device in the pipeline is a hand-pushing crawling device, workers manually push the manual crawling device into the pipeline or air duct, and collect video, image and audio information in the pipeline through manual operation, thereby realizing the purpose of detecting the interior of the pipeline and greatly improving the inspection efficiency.

When the in-pipe crawling device is an electric crawling device, the electric crawling device is controlled by the control unit to automatically crawl inside the pipeline, and thus the video, image and audio information inside the pipeline are collected, so as to achieve the purpose of inspecting the interior of the pipeline. Compared with the manual crawling device, the electric crawling device improves work efficiency, and at the same time reduces the personal injury risk for workers entering the pipeline due to installation errors or operating errors.

In addition, the present invention is also provided with a voice control device. Workers sometimes need to operate multiple devices at the same time on the job site, and they often have to use dirty hands to operate the console/tablet/computer on site. Therefore, people sometimes have to cooperate with other people to complete a detection job on the spot, and sometimes even a simple job. In this case, it is very important to develop a more effective, manpower-saving and easier-to-operate video inspection robot system. The invention integrates the speech recognition technology into the video inspection robotic system. Through this system which provides voice activation control function, people can operate the system by using voice commands very easily, and work with a minimum of manual operations. Such a voice-controlled video inspection robotic system allows people to complete a relatively complex inspection task more easily and independently without the help of others.

According to FIGS. 1-3, the control unit 2 is positioned on the cable rack 4. The cable rack 4 is provided with a reel device 5. One end of the cable 20 connected to the control unit 2 is wound on the reel device 5.

The reel device 5 is also provided with a handle. The handle is connected to a shaft of the reel device 5 and is provided on the outer sidewall of the cable rack 4. When cable 20 needs to be wound onto the reel device 5, the reel device 5 can be rotated by the handle to reel the cable 20 in. When the crawling device is moving in the pipeline, the reel device 5 rotates on the cable rack 4 based on the movement of the crawling device and reels the cable 20 out.

As shown in FIG. 1, the electric crawling device comprises a frame 6 and rollers 7. The frame 6 may be a plate-like structure. One side of the frame 6 is provided with the image acquisition unit 1. The two sides of the frame 6 are provided with bearings 21 that are spaced apart from each other. Each bearing 21 is connected to a roller 7. A driving device 8 is provided at one end of the frame 6 away from the image acquisition unit 1, and the driving device 8 is connected to shafts of the rollers 7 on both sides of the frame 6. The driving device 8 is used to drive the two rollers 7 that are away from the image acquisition unit 1 to move in the pipeline.

In use, the driving device 8 is used to drive the crawling device to move in the pipeline. Specifically, the driving device 8 drives the shafts of the rollers 7 to rotate the rollers 7. The frame 6 can move in the pipeline through the rotation of the rollers 7, so as to move the image acquisition unit 1 on the frame 6 and realize the purpose of continuously moving the image acquisition unit 1 for inspection in the pipeline. The electric crawling device is used in conjunction with the cable rack 4 in use. In other words, the cable rack 4 is used outside the pipeline to reel in and out the cable 20 according to the movement of the electric crawling device. The purpose is to reduce the operation of the electric crawling device, reduce the load, and thus increase the battery usage time. In the electric crawling device, the cable connected to the image acquisition unit is a flexible cable, preferably a silicone cable.

As shown in FIG. 2, the voice control device 9 comprises a pickup 10 and a voice processing chip 11. The pickup 10 is connected to the voice processing chip 11, and the voice processing chip 11 is connected to a control chip of the control unit 2.

The pickup 10 is used to pick up voice and transmit the collected voice to the voice processing chip 11. The voice processing chip 11 converts the voice into an analog/digital signal, and then transmits the digital voice signal to the control unit 2. The control unit 2 implements corresponding operations according to the digital voice signal. For example, when a user uses the voice control device 9 to start the driving device 8, the user first says "start crawling" to the pickup 10, and the pickup 10 collects the voice and transmits the voice to the voice processing chip 11. The voice processing chip 11 transmits the processed voice information to the control chip, and the control chip transmits the control signal to the driving device 8 through the cable 20 to initiate the driving device 8, which then rotates the rollers 7 and moves the crawling device in the pipeline.

As shown in FIG. 1, the cable rack 4 is provided with a display screen 12. The display screen 12 is connected to the control unit 2 and is used to display the information collected by the image acquisition unit 1. The image acquisition unit 1 may be a pan-tilt camera. The pan-tilt camera and the frame 6 are connected by a pan-tilt mount. The pan-tilt mount comprises a base 13 and a rotating device. The rotating device comprises a rotation controller 14 and a rotating frame 15. The bottom of the base 13 is connected to the upper surface of the frame 6. The upper portion of the base 13 is connected to the rotating frame 15 and the rotation controller 14. The rotation controller 14 is used to rotate the rotating frame 15 on the base 13. The frame 6 is also provided with a first short-wave radio station 16, and the rotation controller 14 and the driving device 8 are electrically connected to the first short-wave radio station 16. A second short-wave radio station 17 is provided on the cable rack 4, and the second short-wave radio station 17 is connected to the control unit 2 through a wire. The first short-wave radio station 16 is the transmitting end, while the second short-wave radio station 17 is a receiving end.

The display 12 can intuitively display the situation in the pipeline, which is helpful for the user to observe and record the inspection status of the pipeline. The first short-wave radio station 16 and the second short-wave radio station 17 are used to connect the rotation controller 14, the driving device 8 and the control unit 2. When wires in the cable 20 used for controlling the rotation controller 14 or the driving device 8 fail, the first shortwave radio station 16 and the second shortwave radio station 17 can also be used for signal transmission and control. The rotation device is provided such that the pan-tilt camera can be rotated during inspection in the pipeline to realize multi-directional and multi-angle image or video acquisition in the pipeline, thereby improving the quality of inspection and reducing the occurrence of missed inspections.

Figure 14:
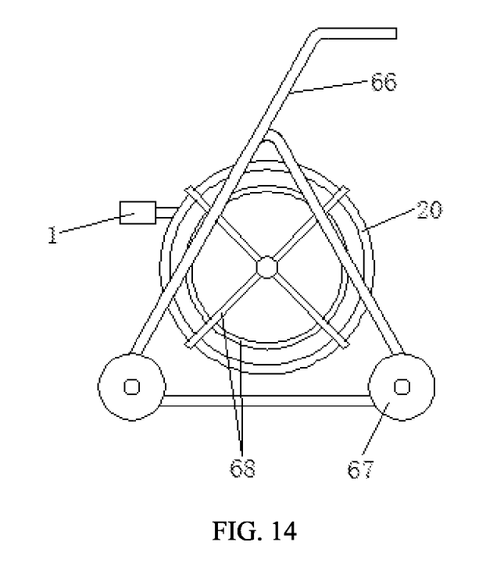
FIG. 14 is a schematic diagram of the structure of the hand-push crawling device of the present invention.

As shown in FIG. 14, the manual crawling device comprises a winding frame and a cable 20. The winding frame comprises a cable reel 68 and a support frame 66. The cable reel 68 is rotatably arranged on the support frame 66. The support frame 66 is also provided with a handle. The cable reel 68 may be a circular frame structure. The cable 20 is wound on the circular frame structure, and the support frame 66 is also provided with image acquisition unit. The image acquisition unit is connected to the control unit 2 through the cable 20. In one embodiment, the cable 20 is an elastic cable.

Frame wheels 67 are provided below the support frame. The frame wheels 67 are used for conveniently moving the support frame in the pipeline or air duct. In use, the user pulls the cable out of the cable reel 68 and uses the elastic cable to push the image acquisition unit 1 into the pipeline or ventilation pipe, so as to smoothly collect data in the pipeline by the image acquisition unit. This not only can improve the transmission of inspection data to the control unit 2, but also eliminate the needs for the user to manually drag the heavy cable 20 when working in the pipeline.

The cable is particularly made of fiberglass, and the fiberglass cable not only can satisfy a certain elasticity of the cable, but also improve the wear resistance of the outer sheath of the core during use, thereby increasing the service life of the cable.

Figure 5:
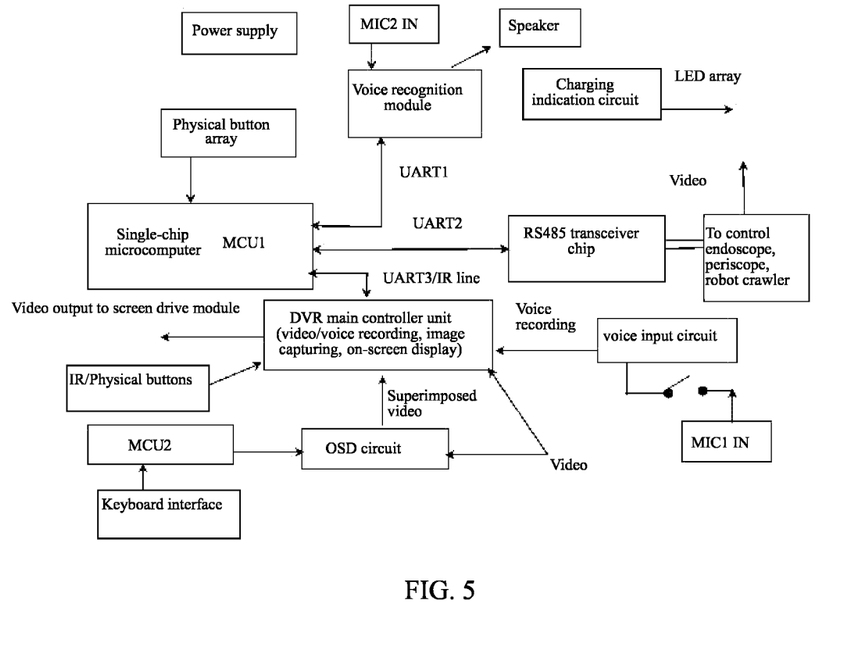
FIG. 5 is a logic diagram of the control unit of the present invention.
Figure 6:
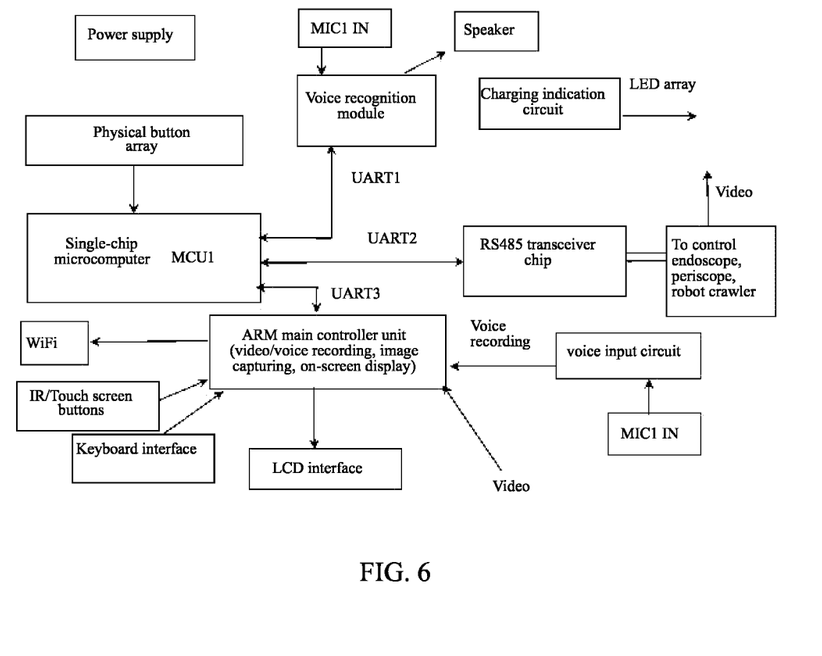
FIG. 6 is another logic diagram of the control unit of the present invention.

According to FIGS. 5 and 6, the control unit 2 comprises at least two control logics. One is the main controller logic of the video recording board, and the other is the main controller logic of Windows/Android/iOS.

FIG. 5 is the block diagram of the main controller logic of the video recording board. The control unit 2 is mainly controlled by a single-chip microcomputer. The single-chip microcomputer is preferably STM 8-3UARTS. The single-chip microcomputer is connected to three single channels. The signal channels comprise a voice recognition module, RS485 transceiver chip and DVR (Digital Video Recorder) main controller.

The voice recognition module is used to connect MIC 2 (microphone 2) and the speaker, so as to recognize the control command given by the user. The control command is picked up by the MIC 2 and transmitted to the voice recognition module. The voice recognition module then passes the control command to the single-chip microcomputer MCU 1. The single-chip microcomputer MCU 1 further recognizes and identifies the control command and outputs a corresponding control instruction to the RS485 transceiver chip.

The RS485 transceiver chip can be used to transmit the control instructions of the single-chip microcomputer MCU 1 to control the endoscope, periscope, and robot crawler to perform corresponding actions. The endoscope, periscope, and robot crawler are arranged on the crawling device of the present invention.

At the same time, the endoscope, periscope, and robot crawler are respectively provided with charging indication circuits, which comprise an LED light array that is arranged on the control unit 2. When the endoscope, periscope and robot crawler have insufficient power, the power status can be seen through of the LED light, and the endoscope, periscope and robot crawler may be charged based on the power status.

The DVR main controller comprises instruction operations such as video recording, voice recording, and snapshot. The single-chip microcomputer MCU 1 can directly send control instructions to the DVR main controller unit, and the DVR main controller unit can use the camera and MIC 2 to collect video, image and voice information in the pipeline according to the instructions of the single-chip microcomputer.

The MIC 2 collects voice commands through the voice recognition module and outputs commands to the single-chip microcomputer MCU 1, so as to use voice commands to replace most of the keypad input commands. The single-chip microcomputer MCU 1 is used to receive keyboard input instructions and voice module instructions, control the camera, crawling device and DVR, and control the voice module to produce sound. In one embodiment, the sound produced by the voice module is processed by an on-screen display circuit, and then the voice instructions are transmitted to the DVR main controller, so as to achieve voice control.

The main controller logic of the video recording board also comprises another implementation method. In this method, MCU 1 is used to pick up the voice inside the pipe, and the picked-up voice is transmitted to the DVR main controller via the voice input circuit. The DVR main controller will then transmit the picked-up voice to the single-chip microcomputer MCU 1. Then, the single-chip microcomputer MCU 2 is used to transmit a comparison video or image to the DVR main controller, and the DVR main controller transmits the video or image photos collected by the camera together with the comparison video or image to MCU 1. In this way, the comparison video or image may be compared with the collected video or image, thereby improving the efficiency of pipeline inspection. Moreover, the damaged part can be analyzed based on the video or image stored for multiple inspections, and the damaged part that is not necessary for maintenance can be analyzed and monitored for a long time. According to the changes during the long-term monitoring, the use may or may not choose to repair the damaged part, which greatly improves the efficiency of pipeline inspection and maintenance. At the same time, nonprofessionals can also perform system operations and then provide feedback to professionals after information collection. Therefore, it can reduce the situation in which the lack of professionals causes prolonged inspection time.

The single-chip microcomputer MCU 2 is also provided with a keyboard, and the control instructions of the single-chip microcomputer MCU 2 can be input through the keyboard. The single-chip microcomputer MCU 2 is superimposed with the video of the DVR main controller through the on-screen display circuit and then displayed by the screen drive module, so as to display the comparison video or image information and the collected video or image information. In this way, the user can intuitively see the situation inside the pipeline.

FIG. 6 is a block diagram of the main control logic of the Windows/Android/iOS system. The control unit 2 is mainly controlled by a single-chip microcomputer. The single-chip microcomputer is preferably STM 8-3UARTS, and the single-chip microcomputer is connected to three signal channels respectively. The three signal channels are: voice recognition module, RS485 transceiver chip and ARM (Advanced RISC Machine) main controller. In the Windows/Android/iOS system main control logic, the voice recognition module and RS485 transceiver chip are identical to the video board main controller logic in architecture. The main difference lies in the ARM main controller. The ARM main controller is used for the command control of the camera or voice recorder. Specifically, the voice control command issued by the voice recognition module is uploaded to the ARM main controller via MCU 1. The ARM main controller responds to various commands such as the keypad, remote control, and voice control, and sends instructions to MCU 1. MCU 1 controls voice control and controls the working status of cameras/crawlers and other equipment via the 485 bus. The video or image information received by the ARM main controller is displayed on the LCD screen. Moreover, the ARM main controller is also provided with a keyboard for operations that cannot be completed by voice commands, such as powering on and off.

As shown in FIGS. 1 and 2,

The MIC 2 collects voice commands through the voice recognition module, and the output commands are sent to the single-chip microcomputer MCU 1, thereby realizing the use of voice commands to replace most of the key input commands, thereby achieving the purpose of intelligent voice control; the single-chip microcomputer MCU 1 is used to receive the keyboard input instructions and voice module instructions, then control the camera, crawling device and DVR main controller control equipment, and control the voice module to emit; the instructions are transmitted to the DVR main controller, so as to achieve the purpose of voice control.

Figure 4:
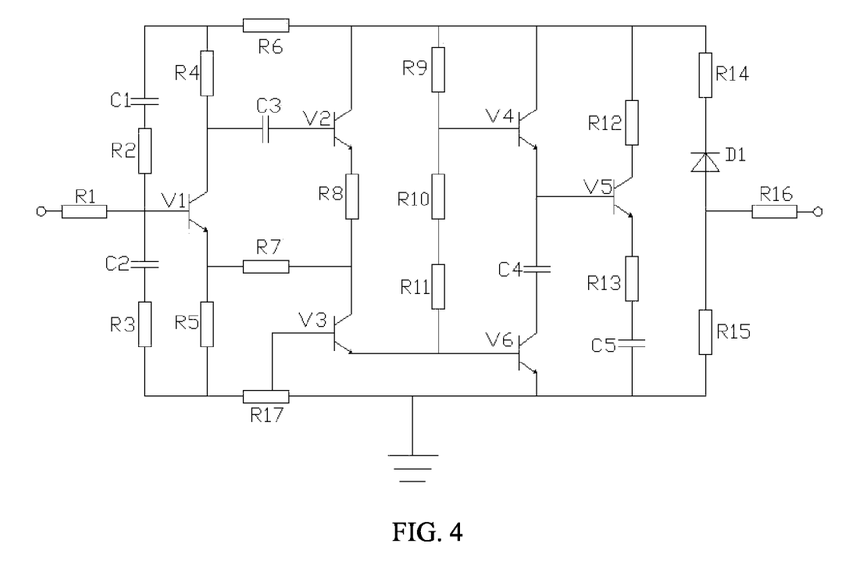
FIG. 4 is a schematic diagram of the structure of the control circuit of the present invention.

According to FIGS. 1 and 2, the cable rack 4 is also provided with an operating platform. The operating platform is connected to the control unit 2 through a wire. A plurality of buttons is provided on the operating panel, and each button is used for a user to manually operate the control unit 2 so as to control the crawling device or the image acquisition unit 1. As shown in FIG. 4, the control unit 2 further comprises a control circuit. The control circuit comprises resistors R1, R2, R3, R4, R5, R6, R7, R8, R9, R10, R11, R12, R13, R14, R15, R16, R17, capacitors C1, C2, C3, C4, C5, triodes V1, V2, V3, V4, V5, V6, and diode D1. One end of the resistor R1 is an input end, which is the signal input end of the control unit 2, and the other end of the resistor R1 is connected to the resistor R2, the capacitor C2, and the base of the triode V1. The collector of the triode V1 is connected to the resistor R4 and the capacitor C3, and the emitter of the triode V1 is connected to the resistors R5 and R7 respectively. The other end of the resistor R2 is connected to one end of the capacitor C1, and the other end of the capacitor C1 is respectively connected to one end of the resistor R4 and R6. The other end of the resistor R6 is connected to the collector of the triode V2. The base of the triode V2 is connected to the capacitor C3, and the emitter of the triode V2 is connected to one end of the resistor R8. The other end of the resistor R8 is connected to one end of the resistor R7 and the collector of the triode V3. The base of the triode V3 is connected to the resistor R17 and grounded, respectively. The emitter of the triode V3 is connected to one end of the resistor R11 and the base of the triode V6. The other end of the resistor R7 is connected to one end of the resistors R3 and R5, and the other end of the resistor R3 is connected to the capacitor C2. The other end of the resistor R11 is connected to one end of the resistor R10, and the other end of the resistor R10 is connected to one end of the resistor R9 and the base of the triode V4 respectively. The other end of the resistor R9 is respectively connected to the collector of the triode V2 and the collector of the triode V4, and the emitter of the triode V4 is connected to one end of the capacitor C4 and the base of the triode V5 respectively. The other end of the capacitor C4 is connected to the collector of the triode V6. The emitter of the triode V6 is grounded and connected to one end of the capacitor C5, and the other end of the capacitor C5 is connected to one end of the resistor R13. The other end of the resistor R13 is connected to the emitter of the triode V5, and the collector of the triode V5 is connected to one end of the resistor R12. The other end of the resistor R12 is connected between the collector of the triode V4 and one end of the resistor R14. The other end of the resistor R14 is connected to the cathode of the diode D1, and the anode of the diode D1 is connected to one end of the resistor R16 and the resistor R15 respectively. The other end of the resistor R16 is an output end.

The control circuit is used to provide a stable power supply to the control unit 2 to ensure that the control unit 2 can achieve low power consumption, high efficiency and stable operation in use. Specifically, the resistor R1 is the input end, which is connected to the power supply. After the power is turned on, the current passes through the triodes V2, V3, V4, and V6 to rectify and stabilize the current and voltage. Finally, the resistor R16 is used to output the current and provide power supply to the control chip. Moreover, there is also provided a blocking circuit. The blocking circuit ensures that there would be no current breakdown during transmission, so as to improve the working stability of the control chip.

Figure 7:
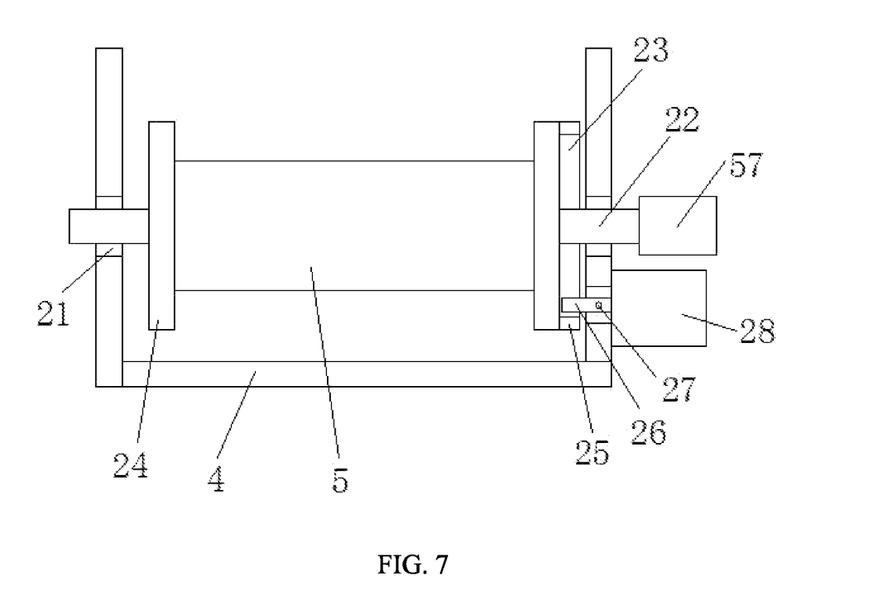
FIG. 7 is a schematic diagram of the connection structure of the position-limiting ring of the present invention.
Figure 8:
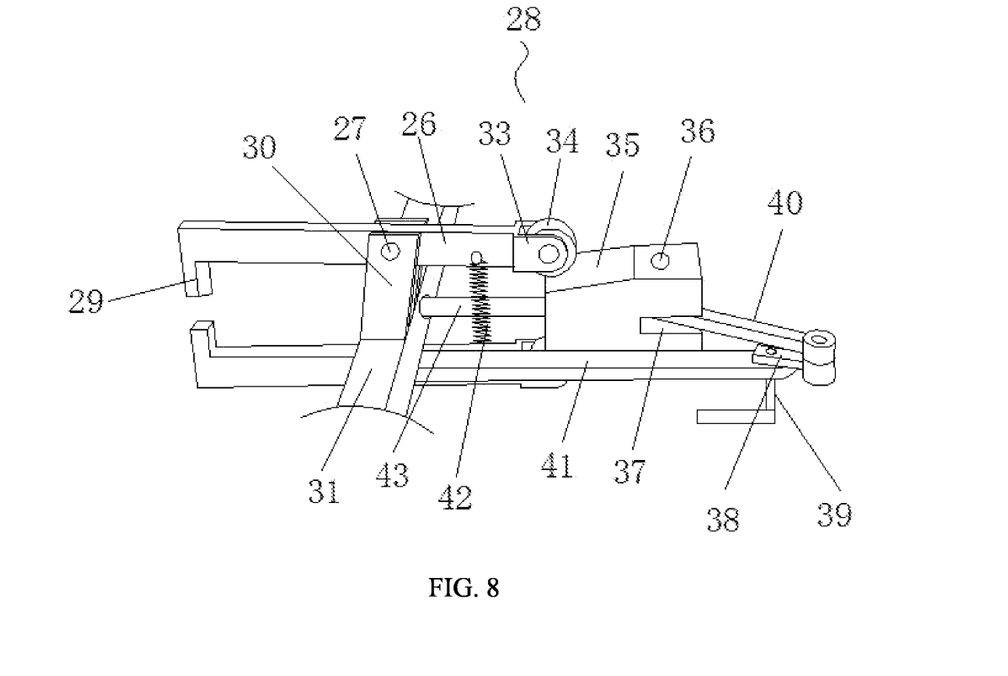
FIG. 8 is a schematic diagram of the structure of the position-limiting device of the present invention.
Figure 9:
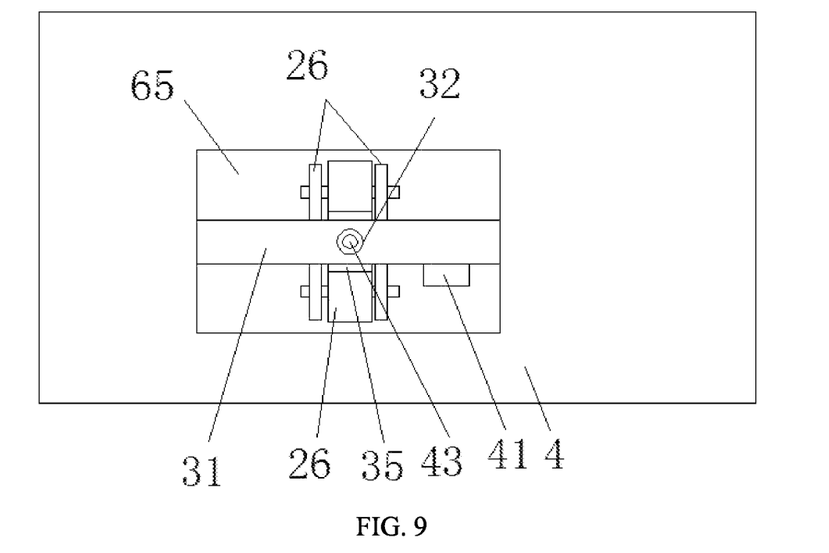
FIG. 9 is a schematic diagram of the connection structure of the position-limiting device of the present invention.

According to FIGS. 7-9, both ends of the reel device 5 are rotatably connected to the cable rack 4 through the first rotating shaft 22. The reel device 5 may be a cylindrical structure, and a disc-shaped stop plate 24 is positioned between the first rotating shafts 22 and the reel device 5. A bearing 21 is arranged on the cable rack 4 to rotatably connect to the first rotating shaft 22. One end of the first rotating shaft 22, which is away from the stop plate 24, is connected to a motor 57. The motor 57 is used to drive the first rotating shaft 22 to rotate on the cable rack 4 through the bearing 21. The stop plate 24 comprises a position-limiting groove 23 on the side adjacent to an inner wall of the cable rack 4. The position-limiting groove 23 is circumferentially provided with a position-limiting ring 25. A position-limiting device 28 penetrates through a side face of the cable rack 4. The position-limiting device 28 and the position-limiting ring 25 cooperate to limit the rotation of the reel device 5. The sidewall of the cable rack 4 is provided with a position-limiting device opening 65. A first connecting rod 31 is horizontally arranged in the center of the position-limiting device opening 65. The first connecting rod 31 is used to install the position-limiting device 28.

In use, the reel device 5 is used to wind the cable 20, and the stop plate 24 is used to restrict the winding position of the cable 20 on the reel device 5. The reel device 5 is rotatably connected to the bearing 21 provided on the inner wall of the cable rack 4 via the first rotating shaft 22. Further, the motor 57 is used to drive the first rotating shaft 22 to rotate, and thus the reel device 5 is rotated. Therefore, when the electric crawling device moves in the pipeline, the reel device 5 can reel the cable in and out. The position-limiting device 28 is located on the side of the cable rack 4. A limiting end of the position-limiting device 28 pass through the position-limiting device opening 65 provided on the side of the cable rack 4, and the position-limiting ring 25 provided on the outside of the reel device 5 is clamped, thereby achieving the purpose of fixing the position of the reel device 5. The position-limiting device 28 can fix the position of the reel device 5 when the reel device 5 is not in use, preventing the reel device 5 from rotation when not in use and thus preventing the cable 20 from being unrestrictedly detached from the reeling device 5.

According to FIGS. 7-10, the position-limiting device 28 comprises a clamping plate 26, a movable block 35, a fixed rod 41, and a connecting rod assembly. One end of the connecting rod assembly is hinged to the movable block 35, and the other end of the connecting rod assembly is hinged to one end of the fixed rod 41. The other end of the fixed rod 41 is fixed on the first connecting rod 31. The clamping plate 26 is hinged to both sides of the first connecting rod 31 through the first fixed plate 30 and the second rotating shaft 27. The clamping plate 26 is provided with a clamping head 29 at one end close to the position-limiting ring 25. The clamping head 29 and the clamping plate 26 are L-shaped, and the clamping head 29 is used to clamp or loosen the position-limiting ring 25. The other end of the clamping plate 26 is provided with a U-shaped frame 33, on which a rotating wheel 34 is hinged. The two clamping plates 26 are connected by a spring 42, the spring 42 is located adjacent to the U-shaped frame 33. A movable block 35 is provided between the rotating wheels 34 of the two clamping plates 26. One end of the movable block 35 is connected to the connecting rod assembly, and the other end is provided with a movable shaft 43. The first connecting rod 31 is provided with a second shaft hole 32 for the movable shaft 43 to move back and forth. The movable block 35 is provided with a guide surface on the outer sidewall adjacent to the movable shaft 43, and the inclination direction of the guide surface faces towards the movable shaft 43. The movable block 35 is provided with a first movable groove 37 at one end far away from the movable shaft 43. A third rotating shaft 36 is arranged in the first movable groove 37, and the third rotating shaft 36 is rotatably connected to the connecting rod assembly. The connecting rod assembly comprises a second connecting rod 38, a third connecting rod 39, and a fourth connecting rod 40. One end of the fourth connecting rod 40 is rotatably connected to the third rotating shaft 36. The other end of the connecting rod 40 is hinged to the second connecting rod 38. One end of the second connecting rod 38, which is away from the fourth connecting rod 40, is fixedly connected to one end of the third connecting rod 39. The third connecting rod 39 penetrates one end of the fixed rod 41 that is far away from the first connecting rod 31. The third connecting rod 39 is rotatably connected to the through hole of the fixed rod 41. Moreover, the third connecting rod 39 is provided with a handle at one end that is away from the fixed rod 41.

In use, the third connecting rod 39 is rotated by the handle. When the third connecting rod 39 rotates on the fixed rod 41, the second connecting rod 38 is driven to rotate. The rotation of the second connecting rod 38 drives the fourth connecting rod 40. Since one end of the fourth connecting rod 40 is rotatably provided at one end of the movable block 35, the other end of the removable block 35 moves reciprocally in the second shaft hole 32 of the first connecting rod 31 through the movable shaft 43. When the movable block 35 moves around the end of the second connecting rod 38 via the fourth connecting rod 40, the movable block 35 can move back and forth in the second shaft hole 32 through the movable shaft 43 to realize the reciprocating movement of the movable block 35. During the reciprocating movement of the movable block 35, the clamping plate 26 is provided with a rotating wheel 34 at the end adjacent to the movable block 35. Therefore, rotating wheel 34 rolls on the outer sidewall of the movable block 35, and the end of the clamping plate 26 adjacent to the movable block 35 is also connected by a spring 42, which is in compressed state when the clamping plate is in its unclamped state. When the movable block 35 moves toward the clamping plate 26 through the connecting rod assembly, the spring 42 is pulled apart by the movement of the movable block 35. One end of the clamping plate 26, which is away from the movable block 35, is clamped by the rotation connection of the first fixed plate 30 and the second rotating shaft 27, so that the clamping end 29 of the clamping plate 26 clamps the position-limiting ring 25, thereby realizing the fixation of the reel device 5. Therefore, the reel device 5 will not rotate when not in use, so as to achieve the purpose of the cable 20 being reeled in and out as needed.

Figure 10:
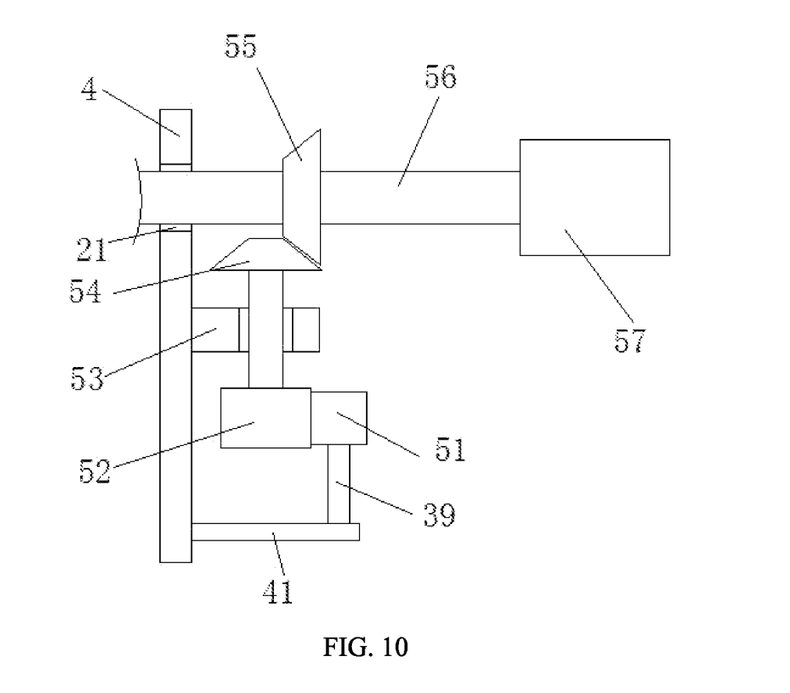
FIG. 10 is a schematic diagram of the connection structure of the first gear and the second gear of the present invention.
Figure 15:
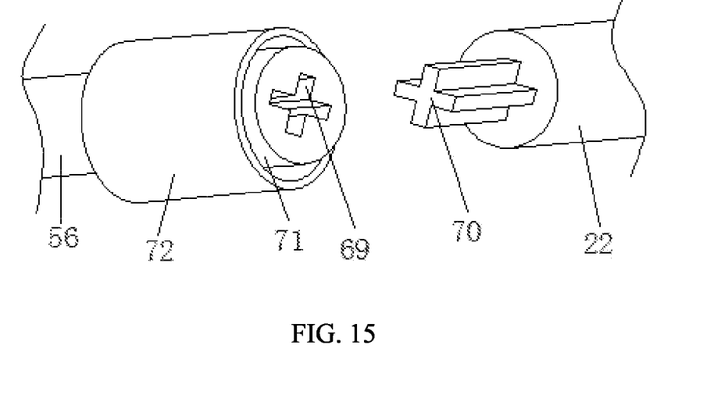
FIG. 15 is a schematic diagram of the connection structure of the first rotating shaft and the fifth rotating shaft of the present invention

According to FIGS. 10 and 15, a fifth rotating shaft 56 is connected between the motor 57 and the first rotating shaft 22. The fifth rotating shaft 56 is located on the outer sidewall of the cable rack 4, and a fourth gear 55 is provided on the circumferential outer wall of the fifth rotating shaft 56. The fourth gear 55 engages with the third gear 54, and the third gear 54 and the fourth gear 55 are bevel gears. One end of the third gear 54, which is far away from the fourth gear 55, is provided with a second gear 52. The second gear 52 engages with the first gear 51, and the first gear 51 is connected to the third connecting rod 39 through an adapter shaft. The third gear 54 and the second gear 52 are connected as a whole by a shaft. The shaft is fixed on the outer sidewall of the cable rack 4 by a fixing frame 53.

In use, when the first rotating shaft 22 and the fifth rotating shaft 56 are not connected, the fifth rotating shaft 56 transmits the driving force of the motor 57 to the shaft of the third gear 54 through the fourth gear 55 and the third gear 54. The third gear 54 then transmits the driving force to the first gear 51 via the second gear 52 at the other end of the shaft. After the first gear 51 rotates, it can drive the third connecting rod 39 to rotate. After the third connecting rod 39 rotates, the position-limiting device 28 can be rotated, thereby driving the position-limiting device 28 to work. Therefore, the position-limiting device 28 clamps or loosen the position-limiting ring 25. In this way, manual operation of the position-limiting device 28 is reduced.

As shown in FIG. 15, the first rotating shaft 22 is provided with a cross post 70 at one end adjacent to the fifth rotating shaft 56, and a matching cross groove 69 is used for the insertion of the cross post 70. The fifth rotating shaft 56 is provided with an extension rod 71. The cross groove 69 is provided at one end of the extension rod 71, which is close to the first rotating shaft 22. The outer walls of the extension rod 71 and the first rotating shaft 22 are provided with a fixing sleeve 72. The fixing sleeve 72 is used to fix the extension rod 71 and the first rotating shaft 22 as a whole. The peripheral outer walls of the extension rod 71 and the first rotating shaft 22 are provided with threads, and the inner wall of the fixing sleeve 72 is also provided with threads. The fixing sleeve 72, the extension rod 71, and the first rotating shaft 22 are fixed as a whole by the threads.

When the reel device 5 needs to be driven, the cross post 70 on the first rotating shaft 22 is first inserted into the cross groove 69 of the extension rod 71. Then the extension rod 71 can be fastened to the first rotating shaft 22 by the fixing sleeve 72, so as to realize the fixation of the first rotating shaft 22 and the fifth rotating shaft 56. Therefore, the reel device 5 can be driven to rotate by the motor 57.

When the reel device 5 does not need to be driven, the fixing sleeve 72 is unscrewed from the first rotating shaft 22 and the extension rod 71 to disengage the first rotating shaft 22 and the extension rod 71. In this way, when the motor 57 operates, the position-limiting device 28 can be driven separately, such that the reel device 5 can be clamped by the position-limiting device 28.

The fifth rotating shaft 56 and the extension rod 71 are provided with a telescopic structure. In other words, the fifth rotating shaft 56 is provided with a telescopic hole, and the extension rod 71 is provided with a telescopic rod. The telescopic rod protracts and retracts in the telescopic hole. Therefore, the cross groove 69 of the extension rod 71 can limit the position of the cross post 70 of the first rotating shaft 22.

In another embodiment, the fourth gear 55 is provided on the extension rod 71. When the extension rod 71 protracts and retracts, the engagement of the fourth gear 55 and the third gear 54 can be directly changed. Therefore, when the fifth rotating shaft 56 drives the reel device 5, the position-limiting device 28 would not be driven. Alternatively, a groove is provided on the sidewall of the cable rack 4, and the fixing frame 53 is provided with a sliding block. The sliding block is movable in the groove. When the position-limiting device 28 is driven by the motor 57, the fixing frame 53 slides toward the fifth rotating shaft 56 and causes the fourth gear 55 and the third gear 54 to engage with each other. When the position-limiting device 28 is not needed, the fixing frame 53 slides toward the motor 57, so that the third gear 54 disengages from the fourth gear 55, such that the third gear 54 is no longer rotated by the fourth gear 55.

In another embodiment, the fourth gear 55 is provided on the extension rod 71, and when the extension rod 71 is expanding or contracting, the engaging of the fourth gear 55 and the third gear 54 can be directly changed, this achieves the purpose of not driving the position-limiting device 28 to work at the same time when the fifth rotating shaft 56 drives the reel device 5; or, a groove is provided on the sidewall of the cable rack 4, and the fixing The fixing frame 53 is provided with a sliding block, and the sliding block is movable in the chute. When the position-limiting device 28 is driven by the motor 57, the fixing frame 53 is slid toward the fifth rotating shaft 56 and causes the fourth gear 55 and the third gear 54 mesh with each other; when the position-limiting device 28 is not needed, the fixing frame 53 slides toward the motor 57, so that the third gear 54 is disengaged from the mesh of the fourth gear 55, It is no longer linked with the rotation of the fourth gear 55.

Figure 11:
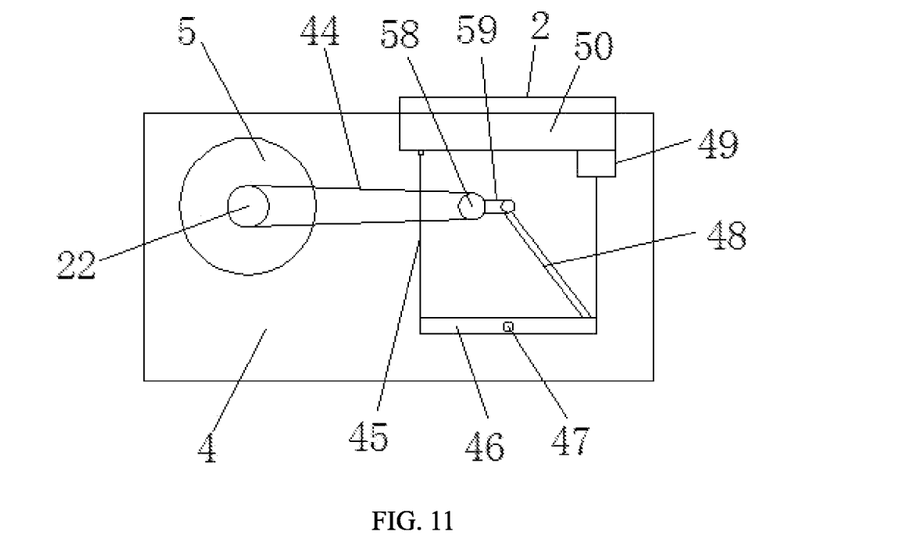
FIG. 11 is a schematic diagram of the connection structure of the cooling device of the present invention.
Figure 12:
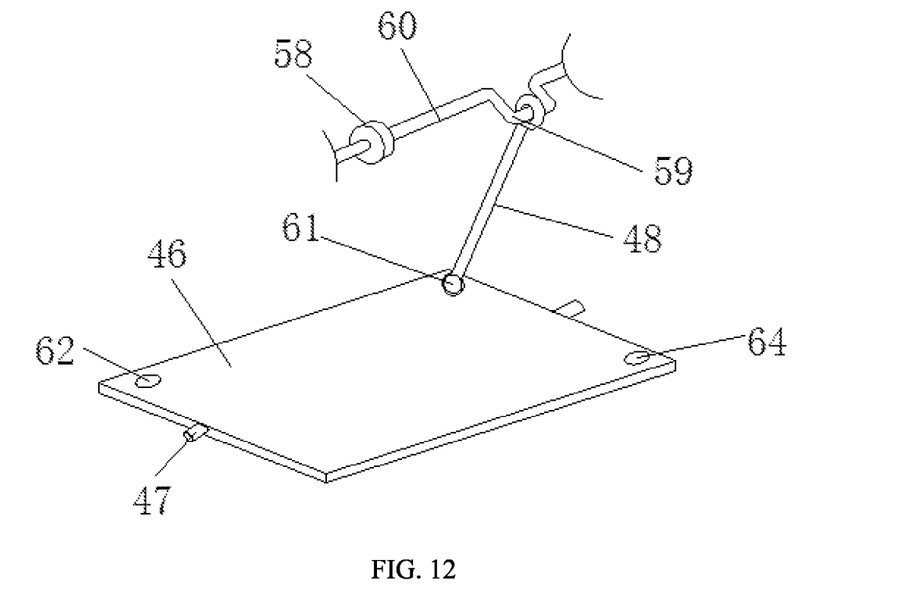
FIG. 12 is a schematic diagram of the structure of the first cooling plate of the present invention.
Figure 13:
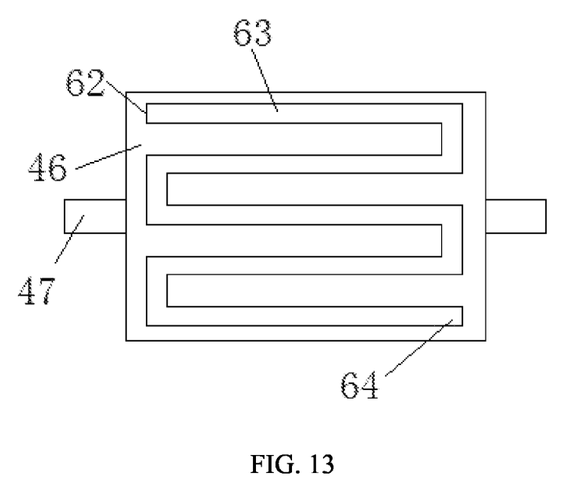
FIG. 13 is a schematic diagram of the cooling water pipe structure of the present invention.

In reference to FIGS. 11-13, the present invention further comprises a cooling device. The cooling device comprises a first cooling plate 46, a second cooling plate 50 and a sixth rotating shaft 60. The sixth rotating shaft 60 is rotatably provided inside the cable rack 4. The sixth rotating shaft 60 is arranged below the control unit 2. The axis of the sixth rotating shaft 60 and the axis of the reel device 5 are arranged in parallel. The outer walls of the sixth rotating shaft 60 and the first rotating shaft 22 are provided with a fifth gear 58 respectively. The fifth gears are connected through an endless chain 44. The sixth rotating shaft 60 is also provided with a U-shaped shaft 59. The U-shaped shaft 59 is rotatably connected to one end of the fifth connecting rod 48. The other end of the fifth connecting rod 48 is provided with a ball joint 61. The ball joint 61 is hinged on the upper surface of the first cooling plate 46, and two ends of the first cooling plate 46 are rotatably connected to the cable rack 4 via a fourth rotating shaft 47 and positioned adjacent to the bottom of the cable rack. The second cooling plate 50 is positioned above the cable rack 4. The upper surface of the second cooling plate 50 is used to place the control unit 2. A cooling water pipe 63 is arranged in the second cooling plate 50. Two ends of the cooling water pipe 63 comprise a water inlet 62 and a water outlet 64, respectively. The second cooling plate 50 is hollow and comprises an interior cavity. The bottom of the second cooling plate 50 is provided with a first circulation opening and a second circulation opening spaced apart. The first circulation opening is connected to the water inlet 62 of the first cooling plate 46 through a connecting water pipe 45. The second circulation opening is provided with a micro water pump 49. One end of the micro water pump 49 is connected to the second circulation opening, and the other end is connected to the water outlet 64 of the first cooling plate 46 through the connecting water pipe 45.

In use, when the reel device 5 operates, the first rotating shaft 22 will be rotated. When the first rotating shaft 22 rotates, the endless chain 44 and the fifth gear 58 arranged on the circumferential outer wall of the first rotating shaft 22 cooperates with the fifth gear 58 of the sixth rotating shaft 60, thereby driving the sixth rotating shaft 60 to rotate in the cable rack 4. When the sixth rotating shaft 60 rotates, the U-shaped shaft 59 provided on the sixth rotating shaft 60 also rotates, and the fifth connecting rod 48 connected on the U-shaped shaft 59 rotates accordingly around the sixth rotating shaft 60, thereby driving the first cooling plate 46 swings in the cable rack 4 via the fourth rotating shaft 47. Since the water inlet 62 and the water outlet 64 of the first cooling plate 46 are respectively connected to the first circulation opening and the second circulation opening of the second cooling plate 50, the control unit 2 can be cooled down when the control unit 2 operates and generates heat. The water in the second cooling plate 50 is heated by the control unit 2 and flows into the water inlet 62 of the first cooling plate 46 via the first circulation opening. Then, the water is cooled down by the first cooling plate 46 swinging back and forth and the cooling water pipe 63 and flows to the micro water pump 49 via the water outlet 64 of the first cooling plate 46 and the connecting water pipe 45. The micro water pump 49 pumps the cooled water into the second cooling plate 50. In this way, the water in the interior cavity of the second cooling plate 50 is cooled by the first cooling plate 46 and once again dissipates heat from the control unit 2, thereby reducing the damage to the control unit 2 due to excessive temperature. The main heat-generating component of the control unit 2 is the control chip. The control chip will run at a high speed, which will generate a large amount of heat. Therefore, reducing the temperature of the control chip can ensure that the control chip operates at normal operating temperature. Otherwise, the continuous high temperature due to long hours of work will cause the control chip to malfunction or burn out.

Obviously, those skilled in the art can make various changes and modifications to the present invention without departing from the spirit and scope of the present invention. If these modifications and variations of the present invention fall within the scope of the claims of the present invention and their equivalent technologies, such as applying intelligent voice control technology to ordinary pipeline and air duct inspection equipment or pipeline and air duct inspection and maintenance robot equipment, as well as other related technical fields, the present invention also intends to include these modifications and variations.

Although the disclosure has been explained in relation to its preferred embodiment, it is to be understood that many other possible modifications and variations can be made without departing from the spirit and scope of the disclosure.

What is claimed is:

1. An intelligent voice-controlled pipeline and air duct video inspection robotic system, comprising: an image acquisition unit (1), a control unit (2), a voice control device (9) and an in-pipe crawling device (3), the image acquisition unit (1) being positioned on the in-pipe crawling device (3), and the in-pipe crawling device (3) being connected to the control unit (2) through a cable (20); the in-pipe crawling device (3) being configured to move in a pipeline, collect images in the pipeline using the image collecting unit (1), and transmit collected image information to the control unit (2) through the cable (20); the voice control device (9) being connected to the control unit (2); the in-pipe crawling device (3) comprising an electric crawling device and a manual crawling device;

the voice control device (9) comprising a pickup (10) and a voice processing chip (11), the pickup (10) being connected to the voice processing chip (11), the voice processing chip (11) being connected to a control chip of the control unit (2), the pickup (10) being used to pick up voice and transmit the voice to the voice processing chip (11), the voice processing chip (11) being configured to convert the voice into an analog or digital voice signal, and then transmit the voice signal to the control unit (2), the control unit (2) being configured to implement corresponding operations according to the voice signal;

the control unit (2) being positioned on a cable rack (4) which is provided with a reel device (5), and one end of the cable (20) connected to the control unit (2) being wound on the reel device (5);

both ends of the reel device (5) being rotatably connected to the cable rack (4) through a first rotating shaft (22), the reel device (5) being a cylindrical structure, and a disc-shaped stop plate (24) being positioned between the reel device (5) and the first rotating shaft (22); the cable rack (4) being provided with a bearing (21) which is used for being rotatably connected to the first rotating shaft (22), one end of the first rotating shaft (22) far away from the stop plate (24) being connected to a motor (57), and the motor (57) being used for driving the first rotating shaft (22) to rotate on the cable rack (4) through the bearing (21); the stop plate (24) comprising a position-limiting groove (23) on a side adjacent to an inner wall of the cable rack (4), the position-limiting groove (23) being circumferentially provided with a position-limiting ring (25); a position-limiting device (28) penetrating through a side face of the cable rack (4), and the position-limiting device (28) the position-limiting ring (25) cooperating to limit the rotation of the reel device (5); a sidewall of the cable rack (4) comprising a position-limiting device opening (65), a first connecting rod (31) being horizontally arranged in the center of the position-limiting device opening (65), and the first connecting rod (31) being used for installing the position-limiting device (28);

the position-limiting device (28) comprising a clamping plate (26), a movable block (35), a fixed rod (41) and a connecting rod assembly, one end of the connecting rod assembly being hinged to the movable block (35), the other end of the connecting rod assembly being hinged to one end of the fixed rod (41), and the other end of the fixed rod (41) being fixed on the first connecting rod (31); the clamping plate (26) being hinged to both sides of the first connecting rod (31) through a first fixed plate (30) and a second rotating shaft (27); the clamping plate (26) comprising a clamping head (29) at one end close to the position-limiting ring (25), the clamping head (29) and the clamping plate (26) being L-shaped, and the clamping head (29) being used for clamping or loosening the position-limiting ring (25); the other end of the clamping plate (26) being provided with a U-shaped frame (33), and a rotating wheel (34) being hinged on the U-shaped frame (33); two clamping plates (26) being connected through a spring (42), and the spring (42) being adjacent to the U-shaped frame (33); a movable block (35) being provided between the rotating wheels (34) of the two clamping plates (26), one end of the movable block (35) being connected to the connecting rod assembly, the other end of the movable block being provided with a movable shaft (43), the first connecting rod (31) being provided with a second shaft hole (32) for the movable shaft (43) to move back and forth, the movable block (35) being provided with a guide surface on the outer sidewall adjacent to the movable shaft (43), and inclination direction of the guide surface faces towards the movable shaft (43); the movable block (35) being provided with a first movable groove (37) at one end far away from the movable shaft (43), a third rotating shaft (36) being arranged in the first movable groove (37), the third rotating shaft (36) being rotatably connected to the connecting rod assembly; the connecting rod assembly comprising a second connecting rod (38), a third connecting rod (39) and a fourth connecting rod (40); one end of the fourth connecting rod (40) being rotatably connected to the third rotating shaft (36), and the other end of the fourth connecting rod (40) being hinged to the second connecting rod (38); one end of the second connecting rod (38), which is far away from the fourth connecting rod (40), being fixedly connected to one end of the third connecting rod (39); the third connecting rod (39) penetrating through one end of the fixed rod (41) that is far away from the first connecting rod (31), the third connecting rod (39) being rotatably connected to a through hole of the fixed rod (41), and the third connecting rod (39) being provided with a handle at one end that is far away from the fixed rod (41); a fifth rotating shaft (56) being further connected between the motor (57) and the first rotating shaft (22), and the fifth rotating shaft (56) being located on the outer sidewall of the cable rack (4); a fourth gear (55) being provided on a circumferential outer wall of the fifth rotating shaft (56), the fourth gear (55) engaging with the third gear (54), and both the third gear (54) and the fourth gear (55) being bevel gears; one end of the third gear (54), which is far away from the fourth gear (55), being provided with a second gear (52), the second gear (52) engaging with the first gear (51), and the first gear (51) being connected to the third connecting rod (39) through an adapter shaft; the third gear (54) and the second gear (52) being connected as a whole through a shaft, and the shaft being fixed on the outer sidewall of the cable rack (4) through a fixing frame (53); the first rotating shaft (22) being provided with a cross post (70) at one end adjacent to the fifth rotating shaft (56), and a matching cross groove (69) being used for inserting the cross post (70); the fifth rotating shaft (56) being provided with an extension rod (71), and the matching cross groove (69) being provided at one end of the extension rod (71), which is close to the first rotating shaft (22); the outer walls of the extension rod (71) and the first rotating shaft (22) being further provided with a fixing sleeve (72), and the fixing sleeve (72) being used for fixing the extension rod (71) and the first rotating shaft (22) as a whole; the peripheral outer walls of the extension rod (71) and the first rotating shaft (22) being provided with threads, and the inner wall of the fixing sleeve (72) being provided with threads; the fixing sleeve (72), the extension rod (71), and the first rotating shaft (22) being fixed as a whole by the threads.

2. The intelligent voice-controlled pipeline and air duct video inspection robotic system as claimed in claim 1, wherein the electric crawling device comprises: a frame (6) and rollers (7); the frame (6) being a plate-like structure, and one side of the frame (6) being provided with an image acquisition unit (1); two sides of the frame (6) being provided with bearings (21) that are spaced apart from each other, and each bearing (21) being connected to a roller (7); a driving device (8) being provided at one end of the frame (6) that is far away from the image acquisition unit (1), and the driving device (8) being connected to shafts of the rollers (7) on both sides of the frame (6) and used for driving two rollers (7) that are far away from the image acquisition unit (1) to move in the pipeline.

3. The intelligent voice-controlled pipeline and air duct video inspection robotic system as claimed in claim 2, wherein the cable rack (4) is provided with a display screen (12), the display screen (12) being connected to the control unit (2) and used for displaying information collected by the image acquisition unit (1); the image acquisition unit (1) being a pan-tilt camera connected to the frame (6) by a pan-tilt mount; the pan-tilt mount comprising a base (13) and a rotating device, the rotating device comprising a rotation controller (14) and a rotating frame (15), the bottom of the base (13) being connected to an upper surface of the frame (6), an upper portion of the base (13) being connected to the rotating frame (15) and the rotation controller (14), and the rotation controller (14) being used for rotating the rotating frame (15) on the base (13); the frame (6) being further provided with a first short-wave radio station (16), and the rotary controller (14) and the driving device (8) being electrically connected to the first short-wave radio station (16); a second short-wave radio station (17) being provided on the cable rack (4), and the second short-wave radio station (17) being connected to the control unit (2) through a wire; the first short-wave radio station (16) being a transmitting end, and the second short-wave radio station (17) being a receiving end.

4. The intelligent voice-controlled pipeline and air duct video inspection robotic system of claim 1, wherein the manual crawling device comprises a winding frame and a cable (20); the winding frame comprising a cable reel (68) and a support frame (66), the cable reel (68) being rotatably arranged on the support frame (66), and a handle being provided on the support frame (66); the cable reel (68) being a circular frame structure, the cable (20) being wound on the circular frame structure, the support frame (66) being further provided with the image acquisition unit, and the image acquisition unit being connected to the control unit (2) through the cable (20); and the cable (20) being an elastic cable.

5. The intelligent voice-controlled pipeline and air duct video inspection robotic system as claimed in claim 1, wherein the cable rack (4) is provided with an operating platform, and the operation platform is connected to the control unit (2) through a wire.

6. The intelligent voice-controlled pipeline and air duct video inspection robotic system as claimed in claim 1, further comprising a cooling device, wherein the cooling device comprises a first cooling plate (46), a second cooling plate (50) and a sixth rotating shaft (60); the sixth rotating shaft (60) being rotatably arranged inside the cable rack (4) and below the control unit (2), and the axis of the sixth rotating shaft (60) being parallel to the axis of the reel device (5); the outer walls of the sixth rotating shaft (60) and the first rotating shaft (22) being provided with a fifth gear (58) respectively, and the fifth gears (58) being connected through an endless chain (44); the sixth rotating shaft (60) being further provided with a U-shaped shaft (59), and the U-shaped shaft (59) being rotatably connected to one end of a fifth connecting rod (48); the other end of the fifth connecting rod (48) being provided with a ball joint (61), the ball joint (61) being hinged on an upper surface of the first cooling plate (46), and two ends of the first cooling plate (46) being rotatably connected to the cable rack (4) via a fourth rotating shaft (47) and positioned adjacent to the bottom of the cable rack; the second cooling plate (50) being positioned above the cable rack (4), and an upper surface of the second cooling plate (50) being used for placing the control unit (2); a cooling water pipe (63) being arranged in the second cooling plate (50), two ends of the cooling water pipe (63) comprising a water inlet (62) and a water outlet (64) respectively; the second cooling plate (50) being hollow and comprising an interior cavity; the bottom of the second cooling plate (50) being provided with a first circulation opening and a second circulation opening spaced apart; the first circulation opening being connected to the water inlet (62) of the first cooling plate (46) through a connecting water pipe (45), and the second circulation opening being provided with a micro water pump (49); one end of the micro water pump (49) being connected to the second circulating opening, and the other end of the micro water pump being connected to the water outlet (64) of the first cooling plate (46) through the connecting water pipe (45).

\* \* \* \* \*